United States Patent [19]

Anderton

[11] Patent Number: 4,556,206

[45] Date of Patent: Dec. 3, 1985

[54] SPLICE WORK TRAY ASSEMBLY

[75] Inventor: John J. Anderton, Oil City, Pa.

[73] Assignee: GTE Products Corporation, Stamford, Conn.

[21] Appl. No.: 438,563

[22] Filed: Nov. 3, 1982

[51] Int. Cl.⁴ .............................................. B23Q 3/00
[52] U.S. Cl. ...................................... 269/16; 269/296; 269/900; 269/903
[58] Field of Search ................. 269/16, 296, 900, 903; 350/96.20, 96.21; 206/303, 203, 483, 565

[56] References Cited

U.S. PATENT DOCUMENTS

| | | | |
|---|---|---|---|
| 1,962,556 | 6/1934 | Eberhardt | 206/565 |
| 2,640,589 | 6/1953 | Foster et al. | 206/565 |
| 4,373,776 | 2/1983 | Purdy | 350/96.2 |

Primary Examiner—Frederick R. Schmidt
Assistant Examiner—Judy J. Hartman
Attorney, Agent, or Firm—John A. Odozynski; William H. McNeill

[57] ABSTRACT

The work tray assembly includes a rectangular PVC board from which a first pair of slots, for the insertion of a splice platform, has been perforated. A second pair of slots, orthogonal to the first, is adapted to accommodate an elongated splice housing. A plurality of arcuately-shaped, flexible plastic clips are mounted in the board for the retention of cladded glass fibers. The board also supports at least one pipelike ring for grasping a vial containing chemicals required to strip and clean the cladded glass fibers. A pair of cable clamps positioned on opposite sides of the board at the extremities of a virtual center line drawn through the first pair of slots positions and supports fiber optic cables brought onto the work tray assembly and across the platform in anticipation of a stripping, cleaning and splicing procedure.

4 Claims, 2 Drawing Figures

4,556,206

SPLICE WORK TRAY ASSEMBLY

TECHNICAL FIELD

This invention relates to the implementation of fiber optic communication and information delivery systems and, more particularly, to an apparatus generally classifiable as a tool for the facilitation of stripping, cleaning and splicing operations on cables comprising glass fiber waveguides.

BACKGROUND OF THE INVENTION

There are many advantages to transmitting light energy via optical fiber waveguides and the use thereof is diverse. Single or multiple fiber waveguides may be used simply for transmitting light to a remote location. Complex communication systems may transmit multiple specific optical signals. These devices often require the coupling of fibers in end-to-end relation. The coupling is a source of light loss with axial misalignment representing a particularly serious problem. Other factors causing signal loss are angular misalignment of fibers, longitudinal separation of fiber ends, and reflection or refraction at the fiber ends.

When placing optical fibers in end-to-end relationship in order to minimize light loss, it is desirable to have a rugged splice that can be simply and reliably used in field installations. The junctioned fibers should be protected from environmental factors and be held securely in place.

The following patents relate to various fiber optic connectors: Clark et al. U.S. Pat. No. 3,922,064, McCartney U.S. Pat. No. 3,990,779, Tardy U.S. Pat. No. 4,050,783, Beauhaire U.S. Pat. No. 4,050,781, Wellington et al. U.S. Pat. No. 4,097,129, and Wellington et al U.S. Pat. No. 4,146,299.

In addition, when two or more optical fibers have been successfully joined by virtue of an appropriate splice, it remains necessary to enclose the splice in a suitable housing in order to provide the splice with a degree of protection from the surrounding environment. To that end, U.S. patent application Ser. No. 396,522 by the same inventor (John J. Anderton) as this application, filed July 8, 1982, discloses a housing that is suitable for the enclosure of a splice such as disclosed in Griffin et al U.S. Pat. No. 4,257,674. Similarly, U.S. patent application Ser. No. 418,339, also by the same inventor as this invention, entitled "Housing for a Fiber Optic Splice", filed on Sept. 14, 1982 describes a somewhat differently configured housing designed to accommodate a splice characterized by a generally tubular contour. That housing includes mating top and bottom sections which when assembled, form an elongated rectangular parallelepipe. The bottom section of the housing is characterized by two sets of teeth positioned at opposite ends and along the sides of a substantially rectangular primary portion. Two pairs of longitudinal cavities positioned near the opposite ends of the bottom section are cut out of the bottom surface of the primary portion. A trough is cut out of the primary portion so as to accommodate the contours of a particular fiber optic splice to be encountered.

The top section of the housing includes a center portion with walls extending downwardly from both sides of the center portion. Elevated members, intergral to and positioned at the ends of the center portion protrude from the surface at the center portion, thereby providing, in concert with the teeth of the bottom section, an aperture through which a glass fiber may be inserted into a fiber optic splice. Tapered tabs extending outwardly from the inner surface of the walls lock into longitudinal cavities cut out of the bottom section so as to maintain a relatively secure relationship between the two sections.

As a preliminary to the splicing operation performed on individual glass fibers as alluded to above, it is necessary to strip back the cable covering by which as many as thirty, but typically twelve or fourteen, separate loosebuffered optical fibers may be surrounded. The covering is often stripped back a length of approximately thirty inches thereby exposing that length of twelve or more hair-like optical fibers. As may well be appreciated, effectuation of the splice, as well as operations ancillary thereto, although rendered relatively straightforward by the inventions cited above, may be further facilitated by appartus for securing the loose fibers during performance of the splicing operations.

Accordingly, U.S. patent application Ser. No. 418,340, again by the inventor of this invention, filed on Sept. 14, 1982, is directed a splice organizer for securing a bundle of loose-buffered optical fibers prior to and during the performance of a splicing operation and operations ancillary thereto. The organizer is constructed from a unitary piece of sheet metal so as to exhibit an I-shaped platform and inverted T-shaped legs, the legs to be inserted into slots provided by a work. The platform supports the fiber bundle which is in turn fastened to the the platform via a clip. Vertical flanges extend upwardly from the sides of the platform at approximately the midpoint thereof.

It is the work tray assembly, alluded to above, which comprises the subject matter of this application.

DISCLOSURE OF THE INVENTION

The above and other objects, advantages and capabilities are achieved in one aspect of this invention by a work tray assembly for facilitating a splicing operation, as well as operation ancillary thereto, on glass fibers bundled in a cable combination.

The assembly comprises a substantially rectangular board which may be fabricated from PVC material. The board exhibits a first pair of diametrically positioned slots configured so as to accommodate the inverted T-shaped legs of a splice organizer. A second pair of slots, substantially orthogonally arranged with respect to the first, is configured to accommodate specifically configured fiber optic splice housings. A plurality of arcuately-shaped flexible clips are attached to the board for the retention of glass fibers. At least one pipelike ring is mounted on the board for grasping vials containing chemicals used in stripping, cleaning and cladding the fibers. A pair of cable clamps positioned on opposite sides of the board at the ends of a virtual center line drawn through the first pair of slots, are included for the positioning and supporting of fiber optic cables brought into the work tray assembly and across the organizer in anticipation of a splicing operation.

DESCRIPTION OF A PREFERRED EMBODIMENT

Figure 1:
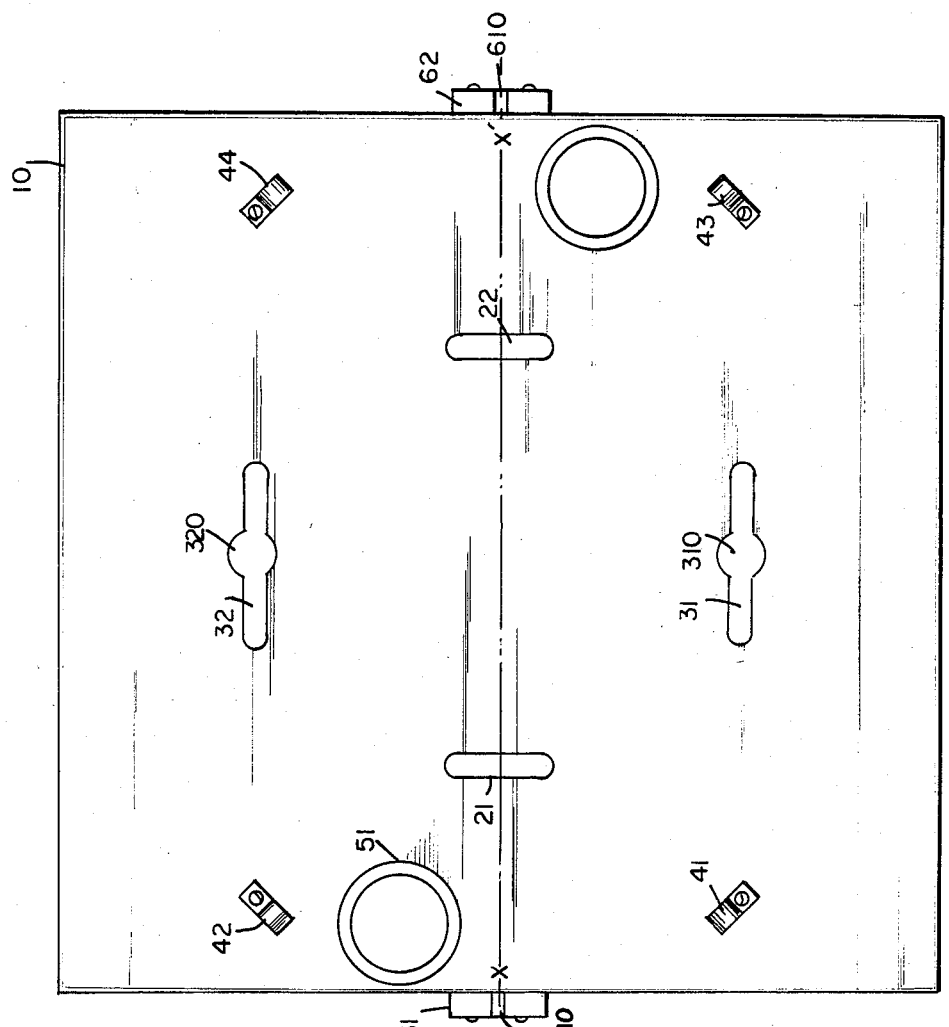
FIGS. 1 and 2 are top and side views respectively of the subject work tray assembly.
Figure 2:
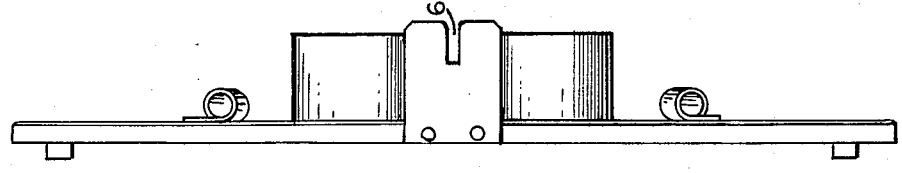

For a better understanding of the present invention, together with the objects advantages and capabilities thereof, refer to the following disclosure and appended claims in conjunction with the accompanying drawing.

Referring now to FIG. A, it can be seen that the subject work tray assembly comprises a substantially rectangular board 10 which may be machined from PVC stock material to an exemplary dimension approximately 18 inches square. The board exhibits a first pair of elongated, diametrically-positioned slots 21 and 22 configured to accomodate the inverted T-shaped legs of a splice organizer such as the one described in U.S. patent application Ser. No. 418,340, alluded to above. The board also exhibits a second pair of elongated, diametrically-positioned slots 31 and 32 configured to accommodate a splice housing such as the one described in U.S. patent application Ser. No. 418,339 also alluded to above. As may be seen in FIG. A, slots 31 and 32 are substantially orthogonally arranged with respect to slots 21 and 22. Slots 31 and 32 exhibit generally elongated contours distinguished by centrally-positioned circular portions 310 and 320. The diameters of portions 310 and 320 are greater than the widths of the remainder of the slots in order to facilitate placement and removal of the splice housing from the board. A plurality (e.g , four) arcuately-shaped flexible clips 41, 42, 43 and 44, which may be molded from plastic stock material, are attached to the board for the retention of cladded glass fibers. A pair of pipelike rings 51 are also mounted on the board in order to grasp vials containing chemicals used to strip and clean the cladded glass fibers. In a specific embodiment the pipelike rings are characterized by a diameter of approximately 1.50 inches and extend above the surface of the board to a height of approximately 1.75 inches.

The tray assembly also includes a pair of cable clamps 61 and 62 positioned on opposite sides of the board at the end of a virtual centerline, x—x' in FIG. A, drawn through the center of slots 21 and 22. As more easily seen in FIG. B, each of the cable clamps is characterized by a substantially rectangular perimeter from which a groove or slot 610 has been struck. The groove extends generally from the top toward the center of the clamp and has a width sufficient to securely accommodate the outer dimension of a fiber optic cable. The slots position and provide support for fiber optic cables brought onto the work tray and across the organizer in anticipation of the splicing operation. The clamps may be attached to the board by means of nuts or other equivalent mechanisms.

Accordingly, while there has been disclosed and described what at present is considered to be a preferrably configured splice work tray assembly for fiber optic cables, it will be obvious to those have ordinary skill in the art that various changes and modifications may be made therein without departing from the scope of the invention as defined by the appended claims.

INDUSTRIAL APPLICABILITY

The subject invention is useful in the implementation of fiber optic communication and information delivery systems.

What is claimed is:

1. A work tray assembly for facilitating a fiber optic splice, the assembly comprising:
    a substantially rectangular board exhibiting a first pair of diametrically-positioned slots configured to accommodate the legs of a splice organizer and exhibiting a second pair of diametrically-positioned slots, said second pair substantially orthogonally arranged with respect to said first pair, configured to accommodate a fiber optic splice housing,
    a plurality of arcuately-shaped flexible clips attached to the board for the retention of cladded glass fibers,
    a least one pipelike ring mounted on the board for grasping vials containing chemicals used to strip and clean the cladded glass fibers, and
    a pair of cable clamps positioned on opposite sides of the board at the ends of a virtual centerline drawn through the first pair of slots, said cable clamps for positioning and supporting fiber optic cables brought onto the work tray assembly and across the organizer in anticipation of a splicing operation.

2. An assembly as defined in claim 1 wherein the second pair of slots exhibit a substantially elongated contours of a predetermined width but exhibit as well centrally-positioned, substantially circular portion characterized by diameters larger than the predetermined width.

3. An assembly as defined in claim 2 wherein the pipelike rings are characterized by a diameter of approximately 1.50 inches and a height of 1.75 inches.

4. An assembly as defined in claim 3 wherein each of the cable clamps is characterized by a generally rectangular perimeter from which a groove has been struck, said groove generally extending from the top toward the center of the clamp and having a width sufficient to accommodate an outer dimension of a fiber optic cable.

* * * * *